United States Patent
Gopalakrishnan et al.

(10) Patent No.: US 10,043,116 B1
(45) Date of Patent: Aug. 7, 2018

(54) SCHEME FOR TEXT ONLY MRC COMPRESSION

(71) Applicant: Xerox Corporation, Norwalk, CT (US)

(72) Inventors: Sainarayanan Gopalakrishnan, Medavakkam (IN); Xing Li, Webster, NY (US); Rajasekar Kanagasabai, Medavakkam (IN); Clara Cuciurean-Zapan, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/486,401

(22) Filed: Apr. 13, 2017

(51) Int. Cl.
| | | |
|---|---|---|
| *H04N 1/403* | (2006.01) | |
| *G06K 15/00* | (2006.01) | |
| *H04N 1/40* | (2006.01) | |
| *G06K 15/02* | (2006.01) | |
| *H04N 1/387* | (2006.01) | |
| *G06T 7/11* | (2017.01) | |
| *G06T 7/90* | (2017.01) | |
| *H04N 1/00* | (2006.01) | |

(52) U.S. Cl.
CPC ............ *G06K 15/1823* (2013.01); *G06T 7/11* (2017.01); *G06T 7/90* (2017.01); *H04N 1/00244* (2013.01); *H04N 1/3872* (2013.01); *H04N 2201/0094* (2013.01)

(58) Field of Classification Search
CPC ......... G06K 15/1823; G06T 7/11; G06T 7/90; H04N 1/00244; H04N 1/3872; H04N 2201/0094

See application file for complete search history.

(56) References Cited

U.S. PATENT DOCUMENTS

| | | | |
|---|---|---|---|
| 9,712,698 B1 * | 7/2017 | Gopalakrishnan | .... G06F 3/1247 |
| 2010/0290704 A1 * | 11/2010 | Christiansen | ............ G06T 9/00 |
| | | | 382/173 |

* cited by examiner

*Primary Examiner* — Quang N Vo (74) *Attorney, Agent, or Firm* — Fay Sharpe LLP (57) ABSTRACT

A system and method for generating a mixed raster content representation of an input image. An input image is segmented into image and text layers. Connected component analysis is performed on the image layer, with each group of connected pixels labeled. For each group, an average color is determined and when a mask layer exists for the color, the pixels in the group are enabled in the mask layer. When a mask layer does not exist for the color, a new mask layer is created and the corresponding pixels enabled. The image layer is then removed and the mask layers are combined into the text layer, whereupon a text only MRC compression file is output.

22 Claims, 10 Drawing Sheets
(6 of 10 Drawing Sheet(s) Filed in Color)

**Indian Overseas Bank Retired Employees
Medical Assistance Scheme**

Combined photograph of the
Applicant & spouse

APPLICATION FOR MEMBERSHIP - ONE TIME OPTION

PENSIONER/FAMILY PENSIONER/NON-PENSIONER/SPOUSE OF THE
NON-PENSIONER/SPOUSE OF THE DECEASED RETIRED EMPLOYEE

1. Name : ARUN. J
2. Permanent Address : NO. 81 1st FLOOR
   GANDHI NAGAR
   ADYAR - CHENNAI E-Mail: arun@gmail.com       Mobile No. 8958645864

3. Roll No. Designation & Name : 518459, LEAD, ADYAR
   of the last attached Branch
4. Date of Birth : 18/08/89
5. Date of joining the Bank : 21/04/2012
6. Date of retirement from Bank's service : 04/06/2013
7. Nature of retirement : Superannuation/Voluntary Retirement/
   VRS 2000 Scheme
8. Designation at the time of retirement : Officer - Scale VII/VI/V/IV/III/II/I
   (Tick the appropriate Cadre) ** Clerical/ sub staff/ PTS
9. Employment details, if any : Employed/Not employed
10. If employed the details thereof :
    i) Name of employer : HCL
    ii) Monthly salary/wages : 10,000 / -
11. Pension particulars : Pensioner/Non pensioner
    Pension order No. and date : VIJAY / 08/06/2027

FIG. 9

**Indian Overseas Bank Retired Employees
Medical Assistance Scheme**

Combined photograph of the
Applicant & spouse

APPLICATION FOR MEMBERSHIP - ONE TIME OPTION

PENSIONER/FAMILY PENSIONER/NON-PENSIONER/SPOUSE OF THE
NON-PENSIONER/SPOUSE OF THE DECEASED RETIRED EMPLOYEE

1. Name : ARUN. J
2. Permanent Address : NO. 81 1st FLOOR
   GANDHI NAGAR
   ADYAR - CHENNAI E-Mail: arun@gmail.com   Mobile No. 8958645864

3. Roll No. Designation & Name : 518459, LEAD, ADYAR
   of the last attached Branch
4. Date of Birth : 18/08/89
5. Date of joining the Bank : 21/04/2012
6. Date of retirement from Bank's service : 04/06/2013
7. Nature of retirement : Superannuation/Voluntary Retirement/
   VRS 2000 Scheme
8. Designation at the time of retirement : Officer - Scale VII/VI/V/IV/III/II/I
   (Tick the appropriate Cadre) ** Clerical/ sub staff/ PTS
9. Employment details, if any : Employed/Not employed
10. If employed the details thereof :
    i) Name of employer : HCL
    ii) Monthly salary/wages : 10,000 / -
11. Pension particulars : Pensioner/Non pensioner
    Pension order No. and date : VIJAY / 08/06/2027

SCHEME FOR TEXT ONLY MRC COMPRESSION

BACKGROUND

Mixed Raster Content ("MRC") compression has been widely used to achieve smaller file size and good text quality. Typically, the scanned image is segmented into text components and image components. These different components are compressed using different techniques. For example, the text components are compressed using a lossless compression, whereas the image components are compressed using a lossy compression. By recording appropriate color information, colors of the text can be retained even in the binary layer. Only through MRC format can text be stored as binary with their color.

Often times, text is missed during the segmentation process, which missed text remains in image layer at high compression. This affects the quality of the text. Color text and text in color backgrounds are particularly challenging. Even when a user selects text mode scanning by a multifunction peripheral device ("MFP"), there is the possibility of losing text into the image layer. End users face this issue quite often and there are currently no options available at the MFP to address this shortcoming.

If a user wants to scan a text document and his/her interest is to have the text be in good quality with the colors of the texts retained and the file size to be optimum, the current option is to use an N-Layer MRC format. However, a major concern using this MRC format is segmentation error. If the segmentation fails to lift the text, then the missed text will be compressed with lossy compression within the image layer, resulting in a degradation of the quality of the missed text. Furthermore, it can be noticed in the MRC compressed files that certain text appears blurred and with low quality. This blurriness and low quality is due to the incorrect segmentation of the text. That is, these texts are identified as images and are highly compressed using JPEG (or other similar lossy compression methods), with the corresponding resolutions scaled down. It will be appreciated that this compression affects the quality of the text such that, among other issues, optical character recognition ("OCR") based analysis on the file will not be reliable.

Accordingly, a reliable option for the user which can provide high text quality while optimizing file size is needed.

INCORPORATION BY REFERENCE

International Telecommunication Union Telecommunications Standardization Sector ("ITU-T"), ITU-T Recommendation T.44, Mixed Raster Content (MRC) (January 2005); and U.S. Pat. No. 9,124,841 to Sudhagar et al., issued on Sep. 1, 2015 and titled CONNECTED COMPONENT ANALYSIS WITH MULTI-THRESHOLDING TO SEGMENT HALFTONES are incorporated herein by reference in their entirety.

BRIEF DESCRIPTION

In one embodiment of this disclosure, described is a method for text only mixed raster content (MRC) compression of an associated document. The method include includes with a processor, converting an image layer of a segmented input image into a binary image, and applying connected component analysis on the image layer to generate a plurality of groups of connected pixels. The method further includes determining an average color for each group of the plurality of groups, and enabling pixels associated with a group in a mask layer when a mask layer corresponding to the average color exists. In addition, the method includes combining each of a plurality of mask layers into a text layer of the segmented input image wherein each mask layer is a text layer, and deleting the image layer from the segmented input image, wherein a text only MRC compressed representation of the associated document is output by the multifunction peripheral device.

In another embodiment of this disclosure, described is a multifunction peripheral device for text only mixed raster content (MRC) compression of an associated document that includes a processor, and memory in communication with the processor. The memory stores instructions which when executed by the processor cause the processor to segment an input image of the associated document into an image layer and a text layer, convert the image layer of the segmented input image into a binary image, and apply connected component analysis on the image layer to generate a plurality of groups of connected pixels. The instructions also direct the processor to, for each group of the plurality of groups, determine an average color such that when a mask layer exists corresponding to the average color, enable pixels associated with the group in the mask layer, and such that when a mask layer corresponding to the average color does not exist, create the mask layer for the average color with the pixels associated with the group enabled. The memory further stores instruction which cause the processor to combine the mask layers into the text layer, and delete the image layer from the segmented input image, wherein a text only MRC compressed representation of the associated document is output.

In still another embodiment of this disclosure, described is a computer-implemented method for text only mixed raster content (MRC) compression of an associated document. The computer-implemented method includes segmenting an input image of the associated document into an image layer and a text layer, and converting the image layer of the segmented input image into a binary image. The computer-implemented method further includes applying connected component analysis on the image layer to generate a plurality of groups of connected pixels, and for each group of the plurality of groups determining an average color, such that when a mask layer exists corresponding to the average color, enabling pixels associated with the group in the mask layer, and when a mask layer corresponding to the average color does not exist, creating the mask layer for the average color with the pixels associated with the group enabled. The computer-implemented method also includes combining the mask layers into the text layer, and deleting the image layer from the segmented input image, wherein a text only MRC compressed representation of the associated document is output by the multifunction peripheral device.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

According to one embodiment, there is provided a system and method that considers all the contents of a document as text and create text only mixed raster content ("MRC") compression, wherein the resulting MRC compression output does not include an image or background layer. In accordance with another embodiment, the subject disclosure provides a new option in a multifunction peripheral device ("MFP") scan setting as "Text Only MRC Compression", wherein the processor or other control component associated with the multifunction peripheral device, as discussed in greater detail below, considers all the content in a scanned page as text and compresses this content using lossless compression in MRC format. In such an embodiment, the generated MRC file does not include any image layers. It will be appreciated that utilization of the systems and methods set forth herein ensure that no text region is missed during segmentation thereby avoiding the application of lossy compression algorithms/methods on text, while simultaneously providing significant file size saving.

Figure 1:
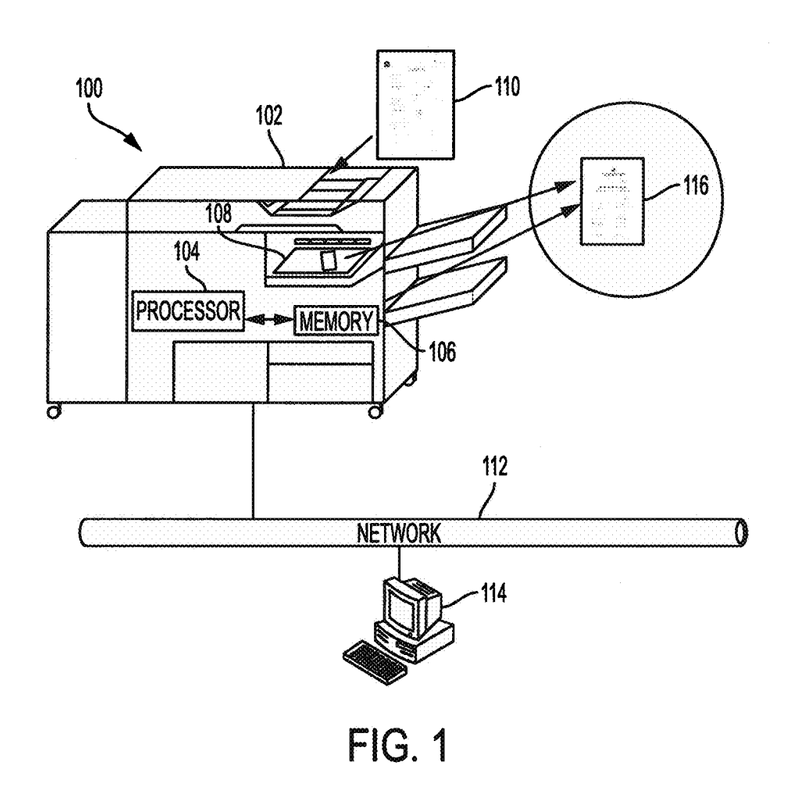
FIG. 1 illustrates a system for text only mixed raster content compression in accordance with one embodiment of the subject application.

Turning now to FIG. 1, there is shown an example system 100 that may be used for text only mixed raster content ("MRC") compression processing of scanned images in accordance with the example embodiments described herein. It will be appreciated that the various components depicted in FIG. 1 are for purposes of illustrating aspects of the subject application, and that other similar components, implemented via hardware, software, or a combination thereof, are capable of being substituted therein. The system 100 includes a multifunction peripheral device 102, which is representative of any computing system, which comprises at least a processor 104 (described in greater detail as the processor 202 of FIG. 2) that executes, and a memory 106 (described in greater detail below as the memory 204 of FIG. 2) that stores computer-executable instructions for providing the various functions, calculations, segmentations, selections, and the like, described herein. It will be appreciated that the multifunction peripheral device 102, is suitably adapted to perform a variety of document processing operations, including, for example and without limitation, scanning, copying, facsimile transmissions, printing, electronic mail communications, document management, document storage, or the like.

In accordance with one embodiment of the subject application, the multifunction peripheral device 102 is capable of being employed as one possible hardware configuration to support the systems and methods described herein. The skilled artisan will further appreciate that although the multifunction peripheral device 102 is illustrated as a stand-alone document processing device, any suitable computing environment is capable of being employed in accordance with the subject application. For example, computing architectures including, but not limited to, multiprocessor, distributed, client/server, tablet, mainframe, supercomputer, digital and analog can be employed in accordance with the one embodiment of the subject application. It will further be appreciated that the multifunction peripheral device 102 may include a computer server, workstation, personal computer, combination thereof, or any other computing device.

The multifunction peripheral device 102 includes at least one processor 104 (see, e.g. FIG. 2), a system memory 106 (see, e.g. FIG. 5), and a system bus (such as the bus 212 of FIG. 2) that couples various system components including the system memory 106 to the processor 104. The processor 104 can be any of various commercially available processors. The processor 104 can be variously embodied, such as by a single-core processor, a dual-core processor (or more generally by a multiple-core processor), a digital processor and cooperating math coprocessor, a digital controller, or the like. The processor 104, in addition to controlling the operation of the multifunction peripheral device 102, executes instructions stored in memory 106 for performing the methods outlined in FIGS. 3 and 4, as described more fully below.

The term "software," as used herein, is intended to encompass any collection or set of instructions executable by a computer or other digital system so as to configure the computer or other digital system to perform the task that is the intent of the software. The term "software" as used herein is also intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The multifunction peripheral device 102 typically includes at least some form of computer readable media. Computer readable media can be any available media that can be accessed by the multifunction peripheral device 102. For example, and without limitation, computer readable media may comprise computer storage media and communication media. Computer storage media includes volatile and nonvolatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. Communication media includes, for example, and without limitation, BLUETOOTH, WiMax, 802.11a, 802.11b, 802.11g, 802.11(x), a proprietary communications channel, infrared, optical, the public switched telephone network, or any suitable wireless data transmission system, or wired communications known in the art. Combinations of any of the above can also be included within the scope of computer readable media.

A user may enter commands and information into the multifunction peripheral device 102 through an input device 108 (see, e.g. FIG. 2) such as a touch-screen interface, a keyboard, a pointing device, such as a mouse, stylus, voice input, or graphical tablet. The multifunction peripheral device 102 is capable of operating in a networked environment using logical and/or physical connections to one or more remote computers, such as a remote computer(s), depicted as the network 112 of FIG. 1. The logical connections depicted include a local area network (LAN) and a wide area network (WAN). Such networking environments are commonplace in offices, enterprise-wide computer networks, intranets and the Internet. Additional functioning of the multifunction peripheral device 102 is discussed in greater detail below with respect to the example multifunction peripheral device system 200 of FIG. 2.

According to one embodiment, the memory 106 includes a job processing queue in which is stored an input image 110 of a document generated via operations of the multifunction peripheral device 102. The job processing queue may further store a text only MRC compressed representation 116 of the document after processing in accordance with the systems and methods set forth herein. As will be appreciated by those skilled in the art, the input image 110 may comprise one or more pages. Furthermore, the input image 110 of the document may include text portions and image portions, as illustrated in the example documents and outputs of FIGS. 5-11, discussed below. In accordance with one embodiment, the user interface 108 may display input image 110 and/or the text only MRC compressed image 116 of a document thereby enabling a user to view the original and/or processed document while in physical proximity to the multifunction device 102. It will be appreciated that the multifunction peripheral device 102 may receive the input image 110 via electronic communication thereof via the network 112, via digital media, or the like. In other embodiments, the multifunction peripheral device 102 generates the input image 110 via scanning of a hardcopy document, as will be understood by those skilled in the art.

As illustrated in FIG. 1, the system 100 also includes a user device 114 in data communication with the network 112. It will be appreciated that the illustration of the user device 114 as a personal computer is for example purposes only, and the subject application is capable of implementation via any suitable computing device including, for example and without limitation, a netbook computer, a laptop computer, a workstation computer, a smartphone, a personal data assistant, a web-enabled cellular telephone, a smart phone, a proprietary network device, or other web-enabled electronic device.

It will be appreciated that the data communications between the multifunction peripheral device 102 and the user device 114 may be accomplished via any suitable channel of data communications via the network 112 known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications. In accordance with one embodiment of the subject application, the user device 114 is suitably configured to interact with the multifunction peripheral device 102 to facilitate document processing, send one or more documents to the device 102 for processing, and the like.

Figure 2:
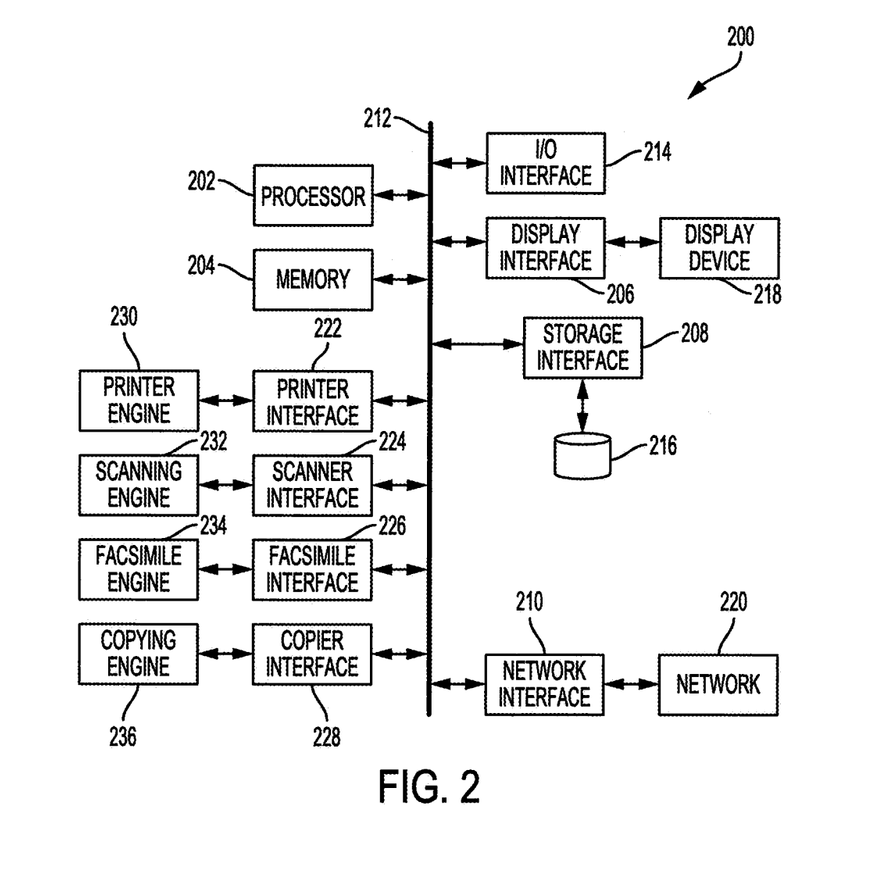
FIG. 2 illustrates a multifunction peripheral device system that is capable of implementation in the system for text only mixed raster content compression in accordance with one embodiment of the subject application.

Turning now to FIG. 2, illustrated is a representative multifunction peripheral device 200 (depicted in FIG. 1 as the multifunction peripheral device 102) that facilitates text only MRC compression of scanned images in connection with one embodiment of the subject application. The multifunction peripheral device 200 includes a processor unit 202 (shown as the processor 104 in FIG. 1) which is advantageously placed in data communication with memory 204 (shown as the memory 106 in FIG. 1), which may include, for example and without limitation, non-volatile read only memory, volatile read only memory, random access memory or a combination thereof, a display interface 206, a storage interface 208, and a network interface 210. In one embodiment, interfacing with the foregoing modules is suitably accomplished via a bus 212. The processor 202 executes, and the memory 204 stores computer-executable instructions for performing the various functions, methods, steps, techniques, and the like, described herein. The processor 202 and memory 204 may be integral to each other or remote but operably coupled to each other.

The memory 204 suitably includes firmware, such as static data or fixed instructions, such as BIOS, system functions, configuration data, and other routines used for operation of the multifunction peripheral device 200 via the processor 202. The memory 204 is further capable of providing a storage area for data and instructions associated with applications and data handling accomplished by the processor 202.

The display interface 206 receives data or instructions from other components on the bus 212, which data is specific to generating a display to facilitate a user interface. The display interface 206 suitably provides output to a display device 218, suitably a video display such as a monitor, LCD, plasma, or any other suitable visual output device as will be appreciated by one of ordinary skill in the art.

As will be appreciated by those skilled in the art, the storage interface 208 is configured to provide a mechanism for non-volatile, bulk or long term storage of data or instructions in the computer system 200. The storage interface 208 suitably uses a storage mechanism, such as storage 216, suitably comprised of a disk, tape, CD, DVD, or other relatively higher capacity addressable or serial storage medium.

Figure 5:
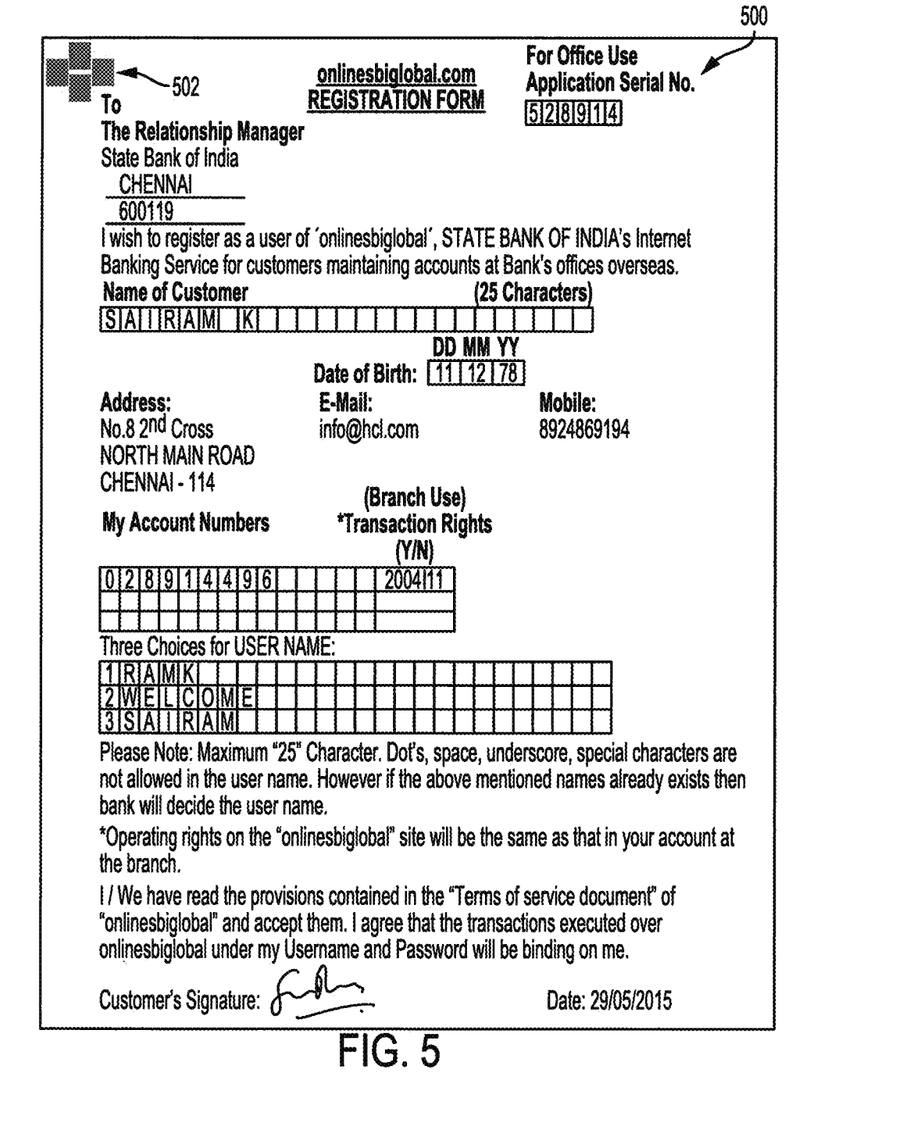
FIG. 5 is an illustration of an input image of a first document in accordance with one embodiment of the subject application.

The network interface 210 suitably comprises a network interface card, a wireless network interface, or the like. It will be appreciated that by one of ordinary skill in the art that a suitable network interface is comprised of both physical and protocol layers and is suitably any wired system, such as Ethernet, token ring, or any other wide area or local area network communication system, or wireless system, such as Wi-Fi, WiMax, or any other suitable wireless network system, as will be appreciated by one of ordinary skill in the art. In the illustration of FIG. 5, the network interface 210 is connected to a physical network 220, suitably comprised of a local area network, wide area network, or a combination thereof.

An input/output interface 214 in data communication with the bus 212 is suitably connected with input devices, such as a keyboard, mouse, pointing device, touch screen inputs, or the like. In addition, the input/output interface 214 is further capable of data input and output to or from a peripheral interface, such as a USB, universal serial bus output, SCSI, IEEE 1394 output, or any other interface as may be appropriate for a selected application.

Also in data communication with the bus 212 are interfaces to one or more document processing engines. As illustrated in FIG. 2, the mu multifunction peripheral device 200 includes a printer interface 222, a scanner interface 224, a copier interface 226, and a facsimile interface 228. According to one embodiment of the subject application, the preceding interfaces 222-228 facilitate respective communication with a printer engine 230, a scanning engine 232, a copier engine 234, and a facsimile engine 236. It is to be appreciated that the multifunction peripheral device 200 suitably accomplishes one or more document processing functions.

It will be appreciated that the print engine 222 suitably enables the output of physical documents representing an electronic document communicated to the multifunction peripheral device 200. It will also be appreciated that the scanning engine 232 is suitably adapted to receive hard copy documents and generate electronic image data therefrom. According to certain embodiments of the subject application, the scanning engine 232 is capable of generating such image data from tangible documents in a variety of forms, including, for example and without limitation, bitmapped data, vector data, page description language formatted data, and the like. It will further be appreciated that optical character recognition is also capable of being performed via functioning of the scanning engine 232. The copier engine 234 is suitably adapted to operate in conjunction with the scanning engine 232 and the printer engine 230 so as to generate tangible copies of input documents, as will be appreciated by those skilled in the art. In accordance with one embodiment, the facsimile engine 236 communicates to or from external facsimile devices (not shown).

Figure 3:
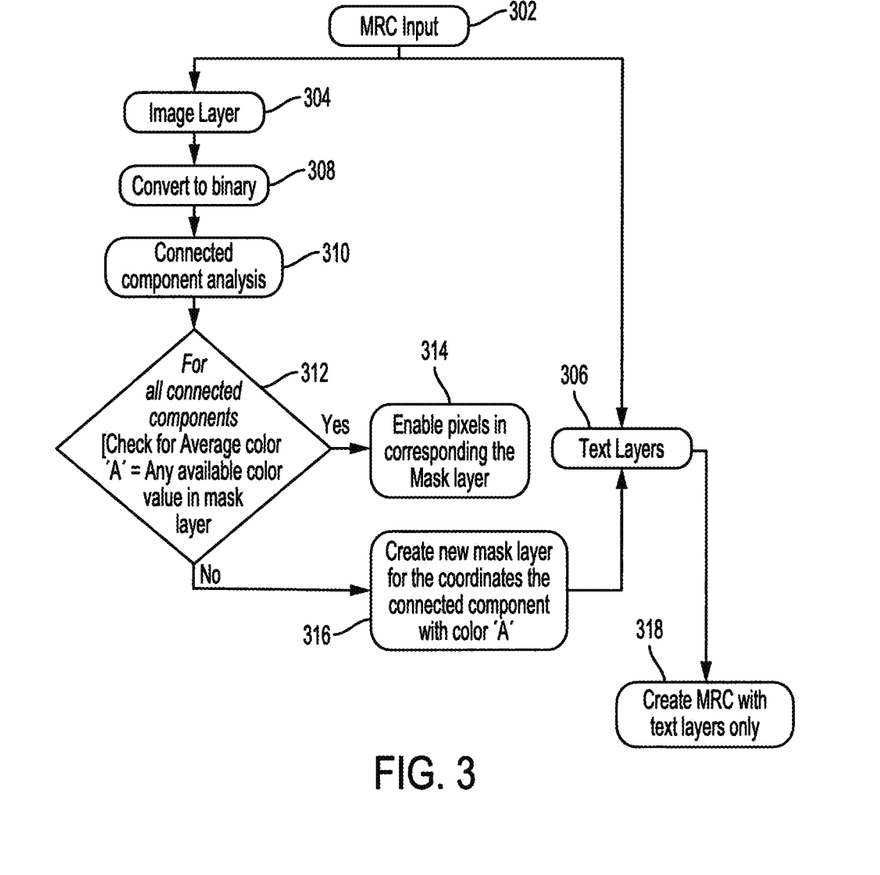
FIG. 3 illustrates a diagrammatic representation of the text only MRC methodology in accordance with one embodiment of the subject application.

Turning now to FIG. 3 with reference to FIG. 1, there is shown an example implementation of the method for text only MRC compression in accordance with one embodiment of the subject disclosure. It will be appreciated that a document is suitably scanned via the multifunction peripheral device 102 or otherwise acquired by the multifunction peripheral device 102 such that a digital image 110 representative of a tangible document is acquired by the multifunction peripheral device 102. Accordingly, at 302, a scanned input image 110 for MRC processing is segmented into an image layer 304 and a text layer 306. According to one embodiment, the segmentation performed on the input image 110 is FIJI segmentation, as will be understood by those skilled in the art. It will further be appreciated by the skilled artisan, however, that other suitable segmentation methods may be used to produce image and text layers in accordance with the systems and methods described herein. Other suitable segmentation methods include, for example and without limitation thresholding-based image segmentation, as set forth in U.S. Pat. No. 9,124,841, the entire disclosure of which is incorporated by reference herein.

The image layer 304 is then converted to binary at 308. That is, the image layer 304 is binarized as white (paper) and non-white (content) regions. Connected component analysis 310 is then performed on the binarized image layer 304, as will be appreciated by those skilled in the art. That is, the connected component analysis 310 is performed on all connected pixels in the non-white region of the binarized image. All connected pixels are then labeled. According to one embodiment, each label associated with the connected pixels corresponds to a unique identifier, such as, for example and without limitation, an alpha-numeric sequence of characters, a unique sequence of integers, or the like.

At 312, a determination is made for each label regarding the average color "A" from the coordinates in the original image of the connected pixels. That is, for every label, first [X,Y] are designated as the set of coordinates of the label. Second, the average color 'A' from the coordinates [X,Y] in the original image is identified or otherwise determined. Third, the determination is made at 312 that if the average color is equal to any of the foreground layer colors within a tolerance range 't', then the pixels in [X,Y] are enabled as 'ON' in the corresponding mask layer at 314. However, if at 312, it is determined that the average color 'A' is not equal to any of the foreground layer colors within a tolerance range then a new mask layer is created with pixels in [X,Y] enabled as 'ON' and the color 'A' is recorded to the layer at 316. Thereafter, once all labels have been analyzed, the image layer is removed and an MRC file with only text layers is created at 318.

It will be understood that the aforementioned exemplary method may be utilized in any of the currently used segmentation methods for MRC compression, as well as on any MRC files previously scanned to correct the wrong segmentation or to convert to text only MRC. As will be appreciated, this conversion reduces file size and also improves the quality of text. In another embodiment, lifting of the image layer content may be performed prior to the scaling down of the image layer.

Figure 4:
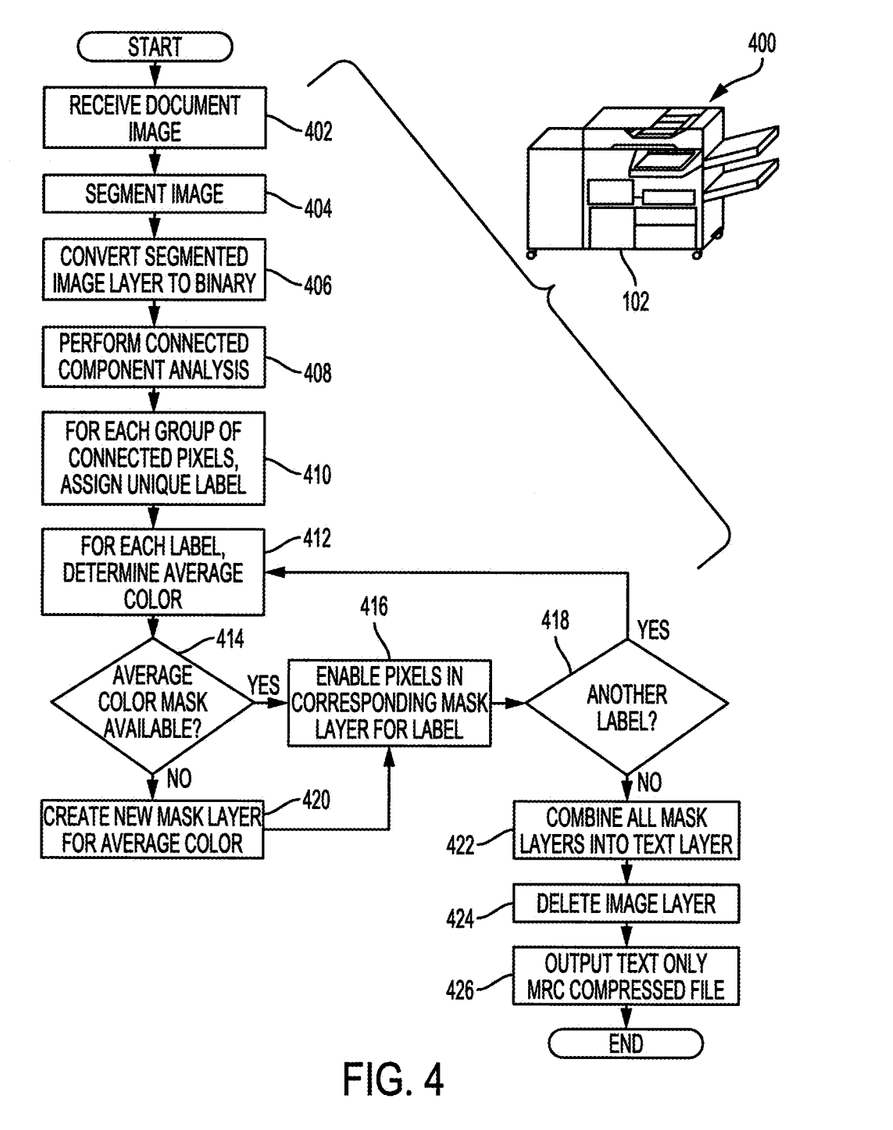
FIG. 4 illustrates a flowchart of an exemplary method for text only MRC compression in accordance with one embodiment of the subject application.

Turning now to FIG. 4, there is shown a flowchart 400 implemented by the processor 104 of the multifunction peripheral device 102 for text only MRC compression in accordance with one embodiment of the subject application. It will be appreciated that the method depicted in the flowchart 400 of FIG. 4 may be stored as instructions in the memory 106 in communication with the processor 104 of the multifunction peripheral device 102, which executes the instructions on an input document image 110 to generate a text only MRC compression representation 116.

The methodology of FIG. 4 begins at 402, whereupon an input image 110 of a document is received by the multifunction peripheral device 102. According to varying embodiments, the input image 110 may be a scan of a hardcopy document produced by the multifunction peripheral device 102, received via electronic communication by the MFP (e.g., via the network 112), or the like. At 404, the received input image 110 is segmented via FIJI segmentation or other suitable segmentation methodology into at least one image layer and a text layer. The segmented image layer is then, at 406, converted to a binary image format via the processor 104 or other suitable component of the multifunction peripheral device 102. For example, the binarized image layer may be a black and white or zero and one (pixel or no pixel) binary format indicating whether the corresponding pixel is part of an image (black or one) or part of the background page (white or zero).

Connected component analysis is then performed at 408 on the binarized segmented image layer. Thereafter, at 410, each group of connected pixels is assigned a label. The label may comprise, for example and without limitation, a unique alphanumeric identifier, coordinates of the group, or other indicia identifying the pixels in the group. At 412, for each label, an average color is determined. That is, the average color found in the image layer (after segmentation and prior to binarization) for the group of pixels located at the coordinates identified by the label is determined.

A determination is then made, at 414, whether the average color associated with the label is already available in a mask layer, i.e. a text layer. A number of layers (i.e., layers 2, 3, 4, . . . ), bi-level data, in a multi-layer segmentation of a page containing a combination of bi-level and multi-level images may be utilized in accordance with one embodiment of the subject application. The bi-level mask layer selects the image layer directly above it or the image(s) below it to be visible. A corresponding image layer pixel above the mask layer is selected for reproduction when a mask layer pixel value is "1". A corresponding pixel from the image or collection of images below the mask is selected when a mask pixel value is "0". The first mask layer (layer 2) may be distinguished as the main mask. The main mask selects the foreground or background to be visible. In a 3-layer segmentation it is simply referenced as the mask layer. When there is more than one mask layer, the other mask layers (layers 2, 3, 4, . . . ) may be referenced as the overlay masks. Number of layers (i.e., layers 2, 3, 4, . . . ), bi-level data, in a multi-layer segmentation of a page containing a combination of bi-level and multi-level images. The bi-level mask layer selects the image layer directly above it or the image(s) below it to be visible. A corresponding image layer pixel above the mask layer is selected for reproduction when a mask layer pixel value is "1". A corresponding pixel from the image or collection of images below the mask is selected when a mask pixel value is "0". The first mask layer (layer 2) may be distinguished as the main mask. The main mask selects the foreground or background to be visible. In a 3-layer segmentation it is simply referenced as the mask layer. When there is more than one mask layer, the other mask layers (layers 2, 3, 4, . . . ) may be referenced as the overlay masks.

Upon a positive determination at 414, operations proceed to 416, whereupon the pixels identified by the label in the corresponding mask layer are enabled. A determination is then made at 418 whether another label remains for processing in the segmented image layer. Upon a positive determination at 418, operations return to 414 for a determination as to whether the average color of the next label is already present in a mask (text) layer.

Upon a determination at 414 that the average color is not present, operations proceed to 420. At 420, a new mask (i.e. text) layer corresponding to that average color is created. Thereafter, at 416, the pixels identified by that label are enabled in the new mask layer and operations proceed to 418 for a determination as to whether any additional labels remain for processing. Upon a negative determination at 418, operations progress to 422, whereupon all mask (i.e. text) layers are combined into the text layer created during the segmentation referenced above at 404. The image layer is then deleted from the input image 110 at 424 as all image content has been moved from the image layer to the text layer via the process set forth above. A text only image 116, i.e., the text only MRC compressed file, is then output by the multifunction peripheral device 102 at 426.

TABLE 1 illustrates an exemplary comparison of a file between current MRC format and Text only MRC format resulting from the systems and methods set forth herein. In TABLE 1, for the sample files, the text layer is lifted from the down scaled image layer.

TABLE 1

| Sample | File Size (KB) | | % of File Saving |
|---|---|---|---|
| | Current | Proposed | |
| 1 | 280 | 111 | 60.35% |
| 2 | 218 | 38 | 82.56% |

In accordance with the systems and methods set forth above, it will be appreciated by those skilled in the art that the wrong segmentation of a scanned image was corrected when the text only MRC compression file was created. Furthermore, image layer content (JPEG compressed contone region) was replaced with binary layer with color information. That is, the image layer content (JPEG compressed contone region) was replaced with binary layer with color information.

Figure 6:
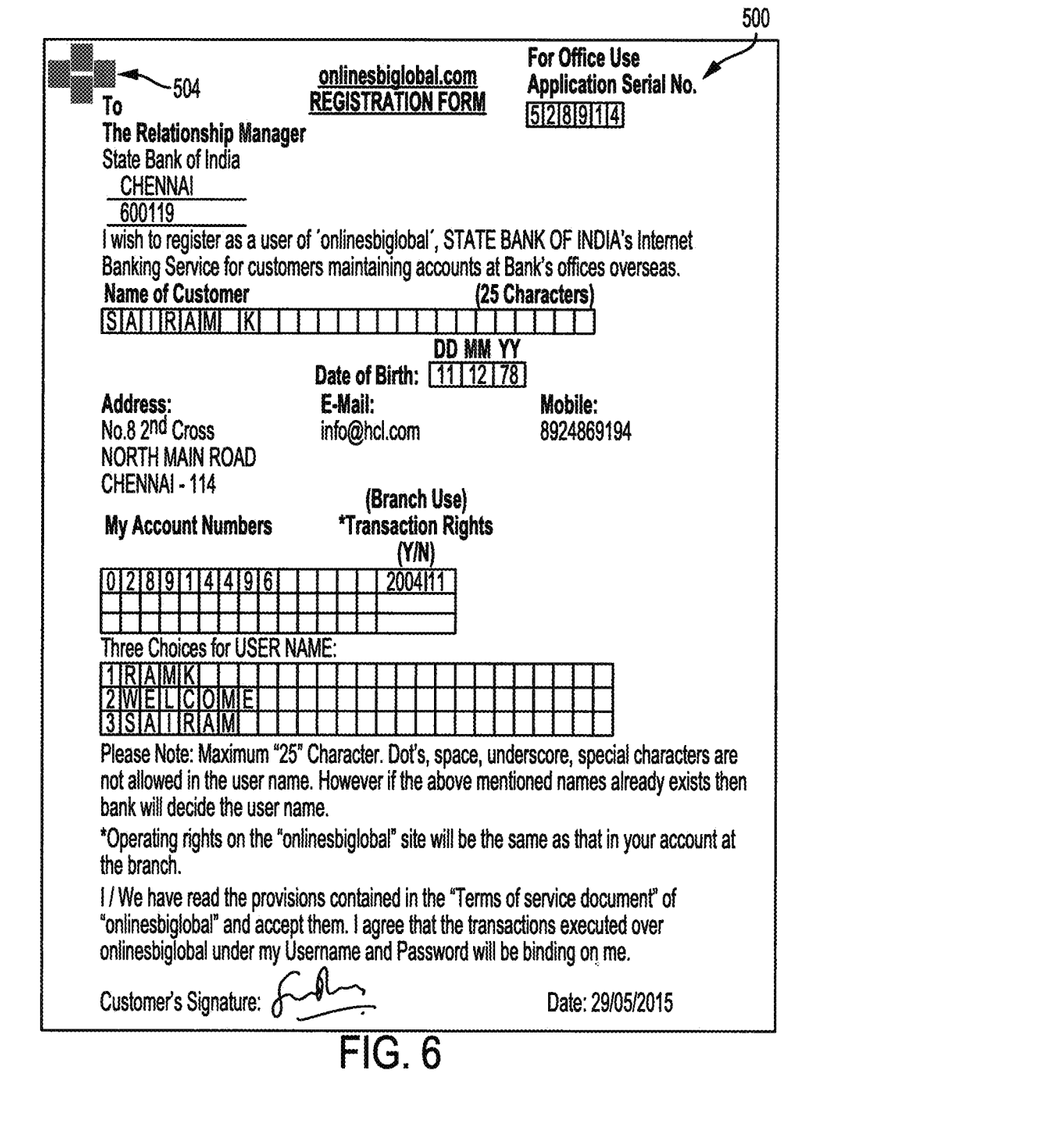
FIG. 6 illustrates a text only MRC compressed image of the first document of FIG. 5 in accordance with one embodiment of the subject application.
Figure 7:
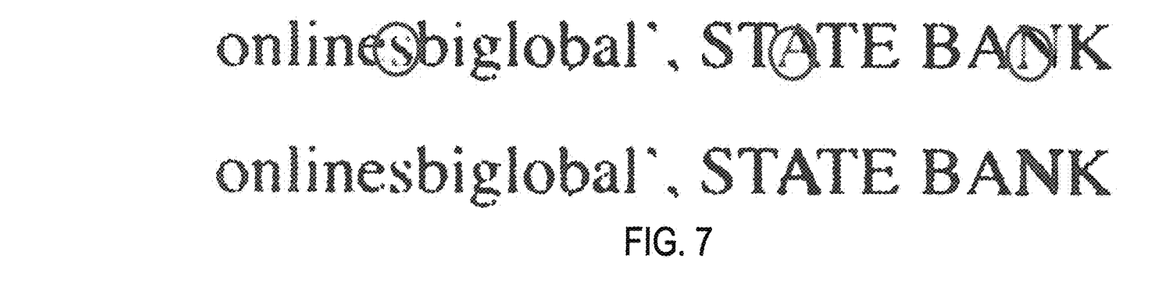
FIG. 7 is an illustration of a text portion of the first document before and after application of the systems and methods set forth in the subject application.
Figure 8:
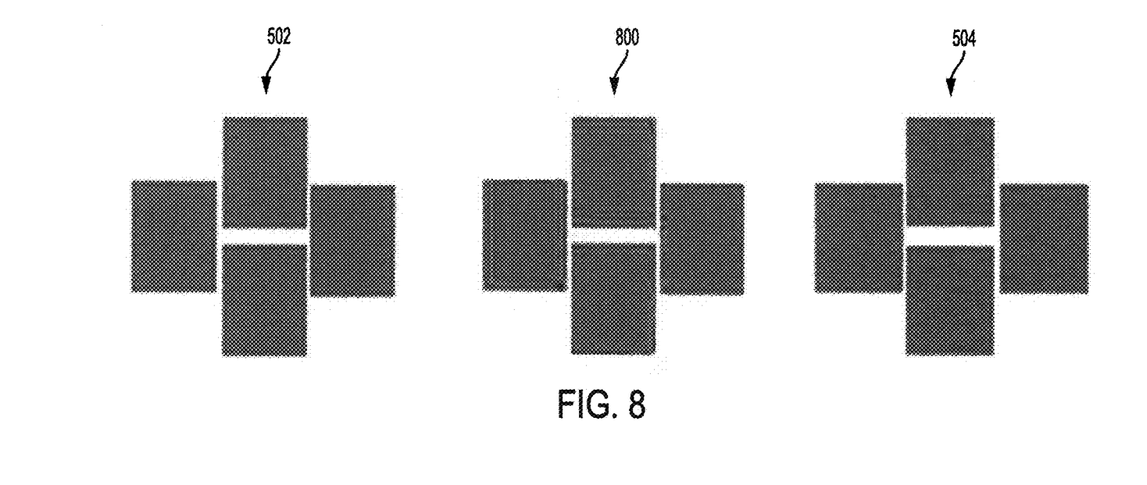
FIG. 8 illustrates an image portion of the first document before application of the systems and methods set forth in the subject application, processed via current methods, and after application of the systems and methods set forth in the subject application.

FIG. 5 provides an example illustration of the current MRC compression processes as used on a first example document 500. FIG. 6 shows the same document 500 of FIG. 5 after application of the text only MRC compression methodology set forth above with respect to FIG. 4. Additionally, FIG. 7 provides an illustration of a text portion of the first document 500 before and after application of the above-referenced method. FIG. 8 provides an illustration of the original input image 502, and the resulting application current compression methods (i.e. the logo 800) wherein part of the logo 502 was compressed using lossy compression and part was compressed using lossless compression. Application of the systems and methods set forth herein, however, illustrate in FIG. 8 that all the regions of the logo 504 were treated as binary with color information.

Figure 9:
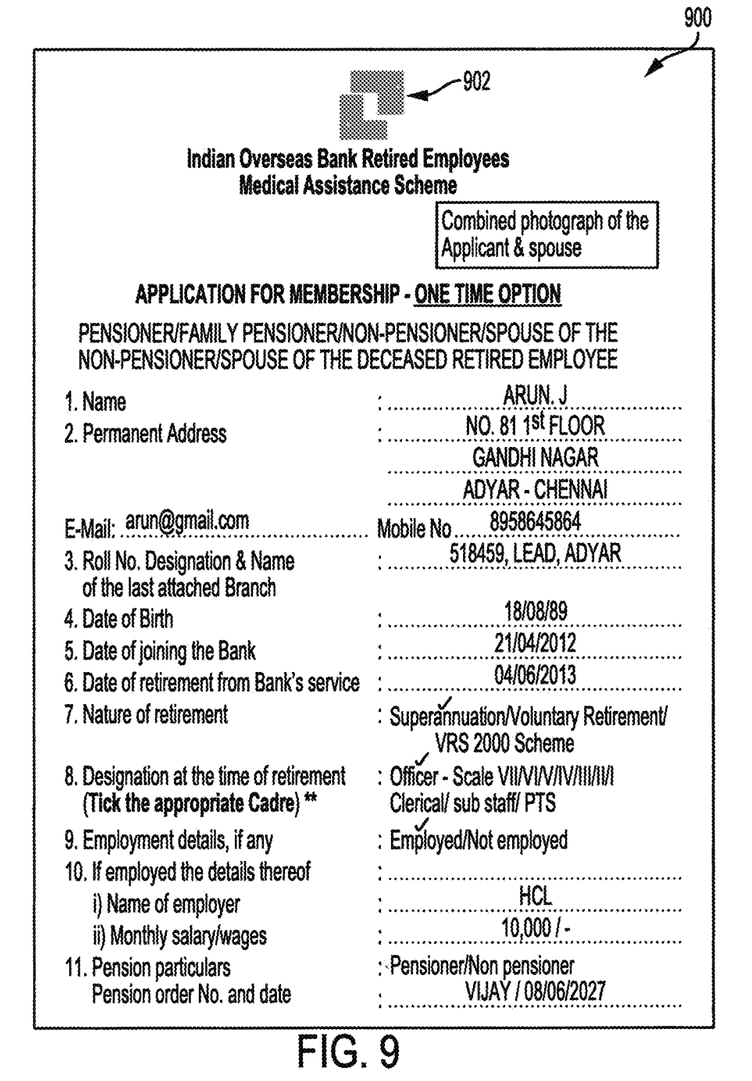
FIG. 9 is an illustration of an input image of a second document in accordance with one embodiment of the subject application.
Figure 10:
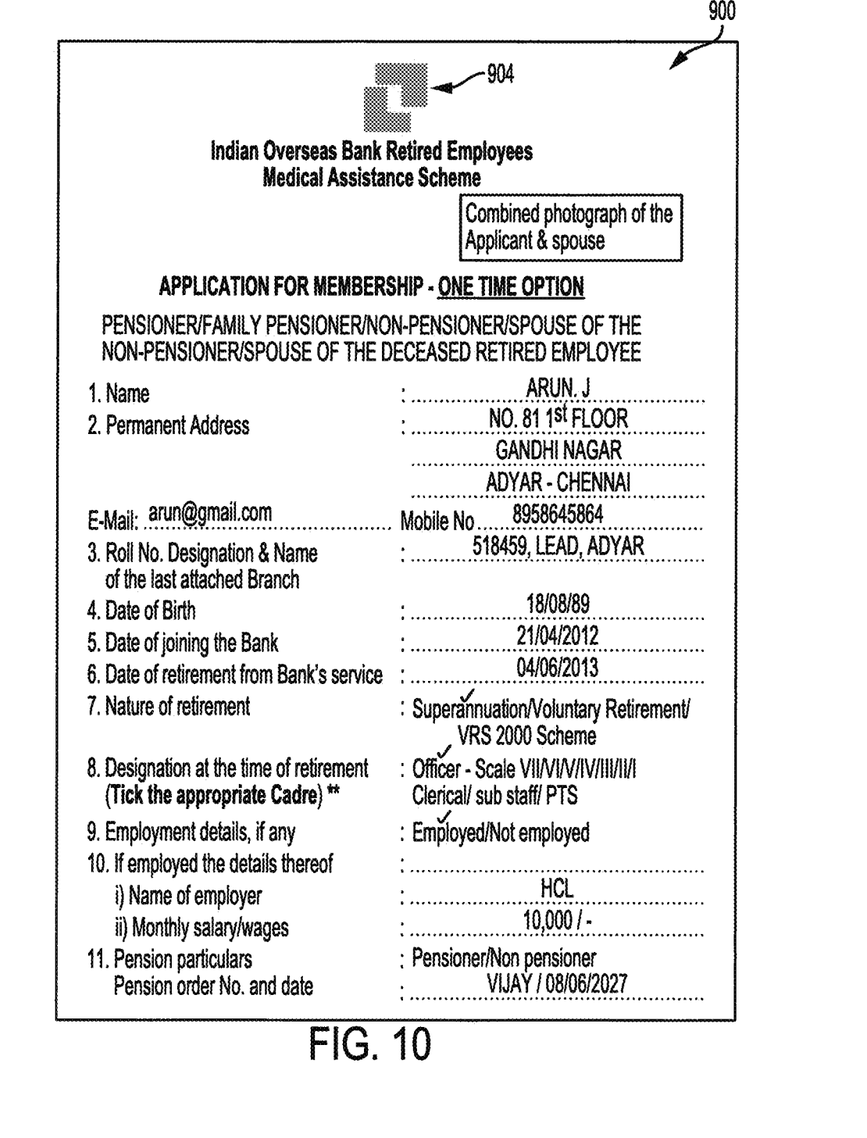
FIG. 10 illustrates a text only MRC compressed image of the second document of FIG. 9 in accordance with one embodiment of the subject application.
Figure 11:
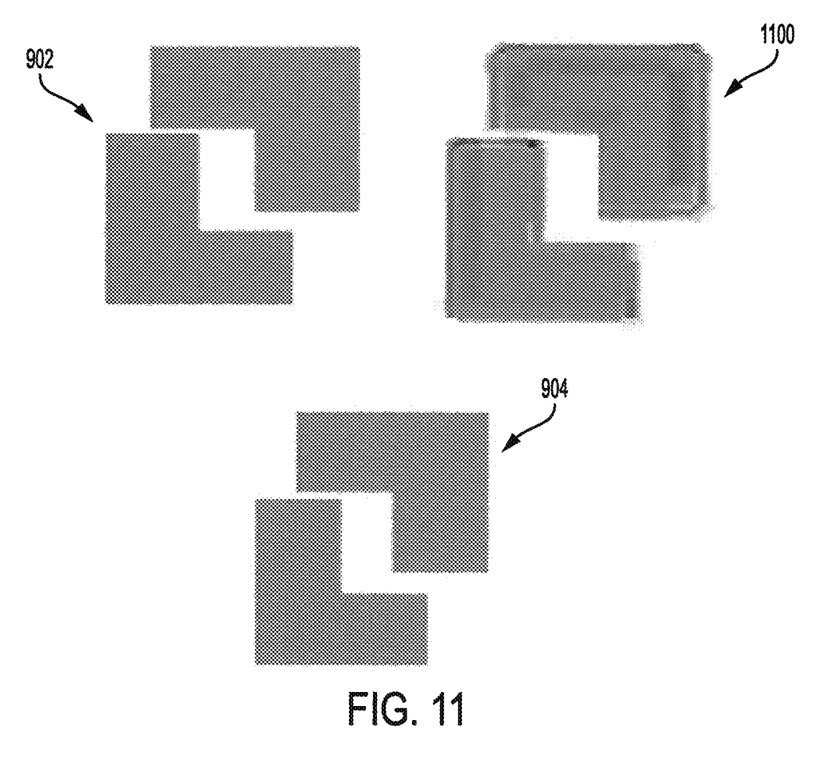
FIG. 11 illustrates an image portion of the second document of FIG. 9 before application of the systems and methods set forth in the subject application, processed via current methods, and after application of the systems and methods set forth in the subject application.

Similarly, FIG. 9 provides an example illustration of the current MRC compression processes as used on a second example document 900. FIG. 10 illustrates the document 900 of FIG. 9 subsequent to the application of the text only MRC compression methodology of FIG. 4. FIG. 11 provides an illustration of the logo 902 included at the top of the document 500 as originally input. The logo 1100, however, illustrates current methods such that had part of the logo 1100 was compressed using lossy compression and part compressed using lossless compression. However, after application of the systems and methods set forth herein, all the regions of the logo 904 were treated as binary with color information as illustrated in FIG. 11.

Accordingly, the systems and methods recited herein provide benefits over the current MRC compression techniques, including for example and without limitation, removal of blurriness due to segmentation errors; reduced file size, improvement of single color logo quality, increased suitability for OCR application, as all text are moved to the text layer.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for text only mixed raster content (MRC) compression of an associated document, comprising:
   with a processor, converting an image layer of a segmented input image into a binary image;
   applying connected component analysis on the image layer to generate a plurality of groups of connected pixels;
   determining an average color for each group of the plurality of groups;
   enabling pixels associated with a group in a mask layer when a mask layer corresponding to the average color exists;
   combining each of a plurality of mask layers into a text layer of the segmented input image, wherein each of the plurality of mask layers is a text layer; and
   deleting the image layer from the segmented input image, wherein a text only MRC compressed representation of the associated document is output by the multifunction peripheral device.

2. The method of claim 1, further comprising:
   for each of the plurality of groups of connected pixels, determining a mask layer corresponding to the average color does not exist;
   creating a mask layer for the average color determined to not exist; and
   enabling the pixels for each of the plurality of groups of connected pixels in the corresponding mask layer associated with the corresponding average color.

3. The method of claim 2, further comprising assigning a label to each of the plurality of groups of connected pixels.

4. The method of claim 3, wherein the label includes a set of coordinates of the group of pixels on the input image document.

5. The method of claim 4, wherein enabling the pixels in the mask layer further comprises:
   determining if the average color of the group of pixels is equal to a foreground color in the mask layer within a tolerance range; and
   enabling, in response to a positive determination, the pixels at the set of coordinates in the mask layer.

6. The method of claim 3, wherein the label is representative of a unique identifier comprising an alphanumeric set of characters.

7. The method of claim 1, wherein the segmented input image is formed via FIJI segmentation.

8. The method of claim 1, wherein the input image is received via operations of an associated multifunction peripheral device.

9. A system for text only mixed raster content compression of an input image comprising memory which stores instructions for performing the method of claim 1 and a processor in communication with the memory which executes the instructions.

10. A computer program product comprising a non-transitory recording medium storing instructions, which when executed by a computer causes the computer to perform the method of claim 1.

11. A multifunction peripheral device for text only mixed raster content (MRC) compression of an associated document, comprising:
a processor; and
memory in communication with the processor, the memory storing instructions which when executed by the processor cause the processor to:
segment an input image of the associated document into an image layer and a text layer;
convert the image layer of the segmented input image into a binary image;
apply connected component analysis on the image layer to generate a plurality of groups of connected pixels;
for each group of the plurality of groups:
determine an average color,
when a mask layer exists corresponding to the average color, enable pixels associated with the group in the mask layer, and
when a mask layer corresponding to the average color does not exist, create the mask layer for the average color with the pixels associated with the group enabled;
combine the mask layers into the text layer; and
delete the image layer from the segmented input image, wherein a text only MRC compressed representation of the associated document is output.

12. The multifunction peripheral device of claim 11, wherein the input image is received via at least one of a scanning operation of the multifunction peripheral device or an electronic communication via a computer network.

13. The multifunction peripheral device of claim 11, wherein the input image is segmented by the processor in accordance with FIJI segmentation.

14. The multifunction peripheral device of claim 11, wherein the memory further stores instructions which are executed by the processor to assign a label to each of the plurality of groups of connected pixels.

15. The multifunction peripheral device of claim 14, wherein the label includes a set of coordinates of the group of pixels on the input image document.

16. The multifunction peripheral device of claim 15, wherein the instructions for enabling of the pixels in the mask layer further comprises instructions which are executed by the processor to:

determine if the average color of the group of pixels is equal to a foreground color in the mask layer within a tolerance range; and
enable, in response to a positive determination, the connected pixels in the mask layer in accordance with the set of coordinates in the corresponding label.

17. The multifunction peripheral device of claim 14, wherein the label is representative of a unique identifier comprising an alphanumeric set of characters.

18. The multifunction peripheral device of claim 11, wherein each mask layer is a text layer.

19. A computer-implemented method for text only mixed raster content (MRC) compression of an associated document, comprising:
segmenting an input image of the associated document into an image layer and a text layer;
converting the image layer of the segmented input image into a binary image;
applying connected component analysis on the image layer to generate a plurality of groups of connected pixels;
for each group of the plurality of groups:
determining an average color,
when a mask layer exists corresponding to the average color, enabling pixels associated with the group in the mask layer, and
when a mask layer corresponding to the average color does not exist, creating the mask layer for the average color with the pixels associated with the group enabled;
combining the mask layers into the text layer; and
deleting the image layer from the segmented input image, wherein a text only MRC compressed representation of the associated document is output by the multifunction peripheral device.

20. The computer-implemented method of claim 19, wherein the input image is segmented by the processor in accordance with FIJI segmentation.

21. The computer-implemented method of claim 20, further comprising:
assigning a label to each of the plurality of groups of connected pixels, the label including a set of coordinates of the group of pixels on the input image document;
determining if the average color of the group of pixels is equal to a foreground color in the mask layer within a tolerance range; and
enabling, in response to a positive determination, the connected pixels in the mask layer in accordance with the set of coordinates in the corresponding label.

22. The computer-implemented method of claim 21, wherein each mask layer is a text layer.

* * * * *